Patented Apr. 2, 1935

1,996,353

UNITED STATES PATENT OFFICE 1,996,353

APPLICATION OF CHLORINATED HYDRO-
CARBONS IN THE TREATMENT OF SEW-
AGE, GARBAGE, DRAINS, DITCHES, ETC.

Herman Seydel, Jersey City, N. J.

No Drawing. Application October 22, 1932,
Serial No. 639,148

11 Claims. (Cl. 210—28)

Investigation and practical tests have disclosed that if chlorinated hydrocarbons of the general character of chlorbenzene are brought into contact with material in various stages of fermentation, the objectionable condition of putrefaction can be controlled with the utmost ease and economy.

The following demonstrations will serve as illustrations:

A sewage disposal plant located close to a suburban residental development caused considerable complaint because of its odor. The plant consisted of a screened inlet feeding into Imhoff digesting tanks from which both sludge and effluent were run onto filter beds. The effluent was chlorinated with from fifty to seventy parts per million in a cement reservoir before being run onto the filter beds.

Both sludge and effluent were taken to the laboratory for investigation.

The sludge, pronounced fully digested, when kept in sealed jar continued to ferment with considerable evolution of gas and odor.

When similarly kept with a small quantity of chlorinated hydrocarbon, the fermentation stopped. The coagulation and sedimentation of the solid was promoted.

The same result was obtained in practice. The sludge was run onto a sand filter bed and the surface immediately sprinkled with a chlorinated benzene. An apparently continuous film was formed which stopped all odor and sign of microbic life.

The sludge was subsequently drenched with surface water and rain (followed with warm sunshine), without emitting any disagreeable or noticeable odor. After drying it was raked off and left the sand bed in a satisfactory condition.

The effluent sample was taken at the run-off from the digesting tank and had the characteristic sulfide odor—the sewage, emanating from a community having no industrial plants, contained nothing but household waste and was not diluted by surface drainage.

Part of the sample was kept in a sealed fruit jar, and the balance was shaken with varying amounts of the chlorinated benzene—the treated parts all readily lost their odor and exhibited no sign of microbic life. The untreated part, on the other hand, continued its process of fermentation, and while not, apparently, as active as the sludge in the formation of gas, was even more objectionable because of its more pronounced sulfidic stench.

A very effective method in the home garbage can is to sprinkle its bottom with the chemical, and keep the cover on the can. The fumes which diffuse, suffice to arrest fermentation as well as the propagation of larvæ and flies.

A practical method of application on public dumps is to first compact the material either by rolling or hydraulic means, and then sprinkle the chemical over the top with any desirable hand or air atomizer; a simple outfit such as is now used in applying paint is entirely satisfactory. Other dumps or refuse heaps can be treated in like manner.

Stagnant pools, ditches, rain water tanks, or cisterns, can be sprayed and the chlorinated hydrocarbon allowed to settle, or it can be added in any convenient manner, and stirred by natural or mechanical means.

The discovery claimed is the use and application of chlorhydrocarbons in fields hitherto not approached. They may be of the aromatic and aliphatic series.

The actual composition of the material may be a straight chemical such as orthodichlorbenzene, but it may also be a mixture of ortho and para, or may contain some chlorinated toluene or other organic compound.

Indeed its value rests as well on its physical as strictly chemical properties, and to its principal constituents may be added solvents or emolients as the differing conditions may require.

In the class of solvents may be cited such products of gas manufacture as solvent naphthas, of coal distillation such as benzene or naphthalene, or again of such natural products as pine oil.

As emolients may be classed soaps, sulphonated oils or sulphonated carbohydrates (the number and variety of which are too great to be enumerated in this application), also alcohols.

The object of these additions is to so prepare the chemical as to assure its greatest value. In a garbage can the method is simple; for a sewage plant or city dump of wide acreage and varying atmospheric conditions, it is well that the solidifying point of the material be low enough to permit its ready atomizing (preferably less than 20° C.), even in winter, and that its vapor density and tension be likewise adapted to summer work.

In mosquito extermination and work of similar character, it has been the practice to cover the surface of pools, catch basins, ditches, etc. with petroleum oil, which floating on the top, shuts off the air, and thus prevents the growth of the larvæ and the development of the fly. The use of the chlorinated hydrocarbons operates in an entirely different manner. The chlorhydrocarbon chosen for this purpose, being heavier than water, sinks, and is kept in a fluid state at the bottom. Through the motion of the water it is kept in ever renewing contact, and is thus emulsified or brought into solution to a degree sufficient to inhibit animal or microbic life. As the material can be compounded (prepared) so as to have a pleasant aromatic odor, such pools or ditches as are treated lose their unsightliness.

Water supplies treated in the manner described need not be rendered unfit for techincal or household purposes (such as washing), and apart from taste would be better for drinking purposes than many untreated and unfiltered public and private water supplies, because of their lower bacterial content.

An important phase of the application of chlorhydrocarbons is their diffusion either in air or water in public dumps or private garbage containers. The vapors should be heavier than air so as to penetrate every crevasse or point of bacterial activity. In water it appears preferable to adjust their density, or dispersibility, so as to obtain the most economical results. It may also be of advantage to have them contain some free or uncombined chlorine, especially where such may be required as an oxydant.

I claim as novel and subject to patent protection:—

1. The method of treating sewage, stagnant water, dumps having organic matter therein, garbage, decomposable materials and the like, for the purposes specified, which consists in adding thereto a chlorhydrocarbon.

2. The method of treating water for controlling and preventing fermentation odors, and propagation of contaminating animal, larval and microbic life which consists in adding to such water a chlorhydrocarbon of low solubility.

3. The method of treating sewage, which consists in adding thereto a chlorinated crude benzene which may contain the various derivatives produced by chlorination.

4. The method of treating sewage which consists in adding thereto a chlorinated hydrocarbon capable of arresting fermentation.

5. The method of treating sewage for the purpose of stopping the growth of microbic life which consists in adding thereto chlorbenzene.

6. The method of treating water for controlling and preventing fermentation odors, and propagation of contaminating animal, larval and microbic life which consists in adding to such water a chlorinated hydrocarbon of the aliphatic series having a density greater than water and having a low solubility in water.

7. The method of treating sewage, stagnant water, dumps having organic matter therein, garbage, decomposable materials, and the like, for the purposes specified, which consists in adding thereto a chlorinated hydrocarbon of the aliphatic series.

8. The method of treating sewage, stagnant water, dumps having organic matter therein, garbage, decomposable materials and the like, for the purpose specified, which consists in adding thereto a chlorinated hydrocarbon of the aromatic series.

9. The method of treating aqueous liquids for controlling fermentation odors and propagation of contaminating animal, larval and microbic life, as are apt to occur therein, which consists in adding to such liquids a chlorinated hydrocarbon.

10. The method of treating aqueous liquids for controlling fermentation odors and propagation of contaminating animal, larval and microbic life, as are apt to occur therein, which consists in adding to such liquids a chlorinated hydrocarbon of the aliphatic series.

11. The method of treating aqueous liquids for controlling fermentation odors and propagation of contaminating animal, larval and microbic life, as are apt to occur therein, which consists in adding to such liquids a chlorinated hydrocarbon of the aromatic series.

HERMAN SEYDEL